US006696142B2

(12) United States Patent
Baer et al.

(10) Patent No.: US 6,696,142 B2
(45) Date of Patent: Feb. 24, 2004

(54) POLYMER 1D PHOTONIC CRYSTALS

(75) Inventors: Eric Baer, Cleveland Hts., OH (US); P. Anne Hiltner, Cleveland, OH (US); James S. Shirk, Alexandria, VA (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 10/391,296

(22) Filed: Mar. 19, 2003

(65) Prior Publication Data
US 2003/0189758 A1 Oct. 9, 2003

Related U.S. Application Data

(63) Continuation of application No. 09/794,492, filed on Feb. 28, 2001, now Pat. No. 6,582,807.
(60) Provisional application No. 60/195,697, filed on Apr. 7, 2000.

(51) Int. Cl.$^7$ ......................... B32B 27/30; B32B 27/32; B32B 27/34; B32B 27/36; G02B 1/04
(52) U.S. Cl. ..................... 428/212; 428/332; 428/411.1; 428/412; 428/419; 428/421; 428/474.4; 428/480; 428/500; 428/522; 428/523; 428/532; 359/321; 359/322; 359/580; 359/581
(58) Field of Search .............................. 359/321, 322, 359/580, 581; 428/212, 332, 411.1, 480, 500, 419, 421, 474.4, 512, 522, 532, 523, 412

(56) References Cited

U.S. PATENT DOCUMENTS

| 4,854,676 A | * | 8/1989 | Kalyanaraman et al. .... 359/243 |
| 4,873,037 A | | 10/1989 | Chau et al. .................... 264/49 |
| 4,874,568 A | | 10/1989 | Chau et al. .................... 264/49 |
| 4,937,134 A | | 6/1990 | Schrenk et al. ............. 428/213 |
| 5,319,492 A | | 6/1994 | Dorn et al. .................. 359/296 |
| 5,389,324 A | | 2/1995 | Lewis et al. ................. 264/171 |
| 5,448,404 A | | 9/1995 | Schrenk et al. ............. 359/584 |
| 5,568,316 A | | 10/1996 | Schrenk et al. ............. 359/584 |
| 5,656,204 A | * | 8/1997 | Nakamura et al. .......... 252/582 |
| 5,740,287 A | * | 4/1998 | Scalora et al. .................. 385/6 |
| 5,976,424 A | | 11/1999 | Weber et al. ................. 264/1.6 |
| 6,025,897 A | | 2/2000 | Weber et al. ................. 349/96 |

FOREIGN PATENT DOCUMENTS

EP      939061 A1 *  9/1999

OTHER PUBLICATIONS

T.G. Brown, et al. Optics Express 3, 385, Nov. 1998.
C. Herbert, et al. Opt. Lett. 17, 1037, Aug. 1992.
N.D. Stankey, et al. Appl. Phys. Lett. 60, 1427, Mar. 1992.
S. Larochelle, et al. Electron. Lett. 26, 1459, Aug. 1990.
R.A. Norwood, et al. Opt Lett. 17, 577, Apr. 1992.
E. Baer, et al. Structure Development During Polymer Processing, 327, Jan. 2000.
J.S. Shirk, et al. Appl. Phys. Lett. 63, 1880 Oct. 1993.
Weber, et al. Science, 287, 2451, Mar. 2000.

* cited by examiner

Primary Examiner—Ramsey Zacharia
(74) Attorney, Agent, or Firm—Stamatios Mylonakis

(57) ABSTRACT

A multilayer nonlinear dielectric optical structure is formed by coextruding at least two polymeric materials, components (a) and (b), using a multiplying element; the structure contains a plurality of alternating layers (A) and (B) represented by formula $(AB)_x$, where $x=2^n$, and n is the number of multiplying elements; at least one of the components (a) and (b) exhibits nonlinear optical response. These structures perform a variety of nonlinear optical functions including all-optical switching and passive optical limiting.

53 Claims, 11 Drawing Sheets

POLYMER 1D PHOTONIC CRYSTALS

This application is a continuation of application Ser. No. 09/794,492, filed Feb. 28, 2001 now U.S. Pat. No. 6,582,807 issued Jun. 24, 2003; application Ser. No. 09/794,492 claims priority to U.S. Provisional patent application Serial No. 60/195,697, filed Apr. 7, 2000, both of which are incorporated herein by reference in their entirety.

BACKGROUND OF THE INVENTION

1. Field of the Invention

This invention relates to the materials and a method for fabricating multilayer nonlinear dielectric optical structures from polymeric materials. In particular, the present invention relates to multilayer materials characterized by a modulation in the nonlinear refractive index in the direction normal to the surface of the layers.

2. Discussion of the Related Art

The propagation of electromagnetic waves through periodic structures consisting of layers of materials with an intensity-dependent dielectric constant has been studied both theoretically and experimentally. A historical review was reported by Brown et al ( T. G. Brown and B. J. Eggleton, *Optics Express* 3, 385 (1998)). The transmission and reflection properties of such structures are strongly modulated by the intensity of the incident light. The optical response of such structures can include optical switching, optical limiting, optical bistability and some remarkable pulse propagation effects including transverse pattern formation.

Some optical effects have been shown experimentally using, for example, colloidal arrays (C. Herbert and M. Malcuit.; *Opt. Lett.* 17, 1037 (1992)), semiconductor multilayers, silicon-on-insulator waveguides (N. D. Sankey, D. F. Prelewitz and T. G. Brown; *Appl. Phys Lett.* 60, 1427 (1992)) and fiber gratings (S. Larochelle, Y. Hibino, V. Mizrahi and G. Stegeman; *Electron. Lett.* 26, 1459 (1990)). An organic nonlinear dielectric stack was reported by Norwood et al. in 1992 using a silicon naphthalocyaine-poly (methyl methacrylate) structure made by spin coating sequential layers (R. A. Norwood et al.; *Opt. Lett.* 17, 577 (1992)). However, only a few layers are possible with a spin coating technique. Norwood et al in the above publication reports only 23 layers.

The preparation of layered structures of polymeric materials by coextrusion has been used to prepare materials with combinations of physical properties. Such materials having three to seven layers are commercially available. More recently, the development of layer multiplying dies has allowed the preparation of multilayer polymeric materials with hundreds or even thousands of layers (E. Baer, J. Kerns, and A. Hiltner; "Processing and Properties of Polymer Microlayered Systems: NATO-ASI on *Structure Development During Polymer Processing*, Guimaraes, Portugal, May 17–28, (1999)). The total thickness of the structured material is controlled by the feed ratio. With thousands of layers, individual layer thickness down to 30 nanometers or less can be achieved. Recent processing improvements and improvements in the multiplying elements allow layer thickness to be constant within a few percent.

Optical properties of nonlinear dyes have led to the development of materials that have a large nonlinear absorption and/or a large nonlinear refraction coefficients (J. S. Shirk, R. G. S. Pong, F. J. Bartoli, A. W. Snow; *Appl. Phys. Lett.*, 63, 1880 (1993)). In these materials, the nonlinear response includes contributions from excited state absorption, excited state nonlinear refraction and thermal refraction. Some of these materials are soluble in polymeric materials that are suitable for the microlayer extrusion process.

Accordingly, there is a need to develop multilayer structures that exhibit improved nonlinear optical response.

SUMMARY OF THE INVENTION

The present invention provides a method and materials for fabrication of a multilayer structure comprising a plurality of at least two alternating layers (A) and (B) represented by formula $(AB)_x$, where $x=2^n$, and n is in the range of from 2 to 15. Layer (A) is comprised of component (a) and layer (B) is comprised of component (b), where at least one of components (a) and (b) exhibits nonlinear optical response.

DESCRIPTION OF THE PREFERRED EMBODIMENTS

Figure 1:
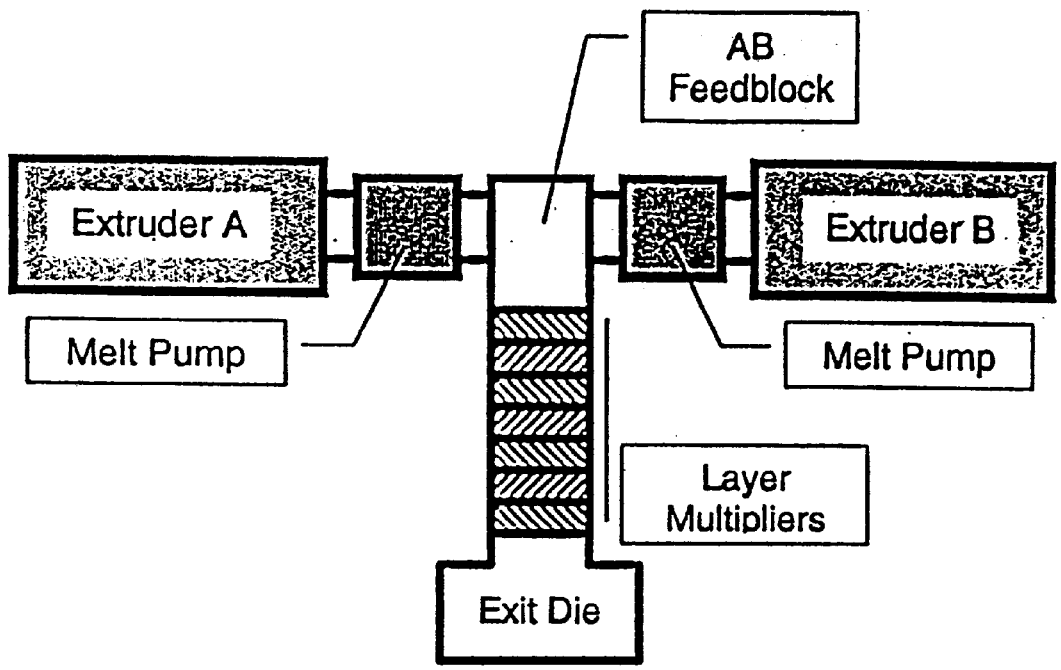
FIG. 1 is a schematic representation of an arrangement for coextrusion of two components (a) and (b) to form a multilayer structure of alternating layers (A) and (B), in accordance with the invention.
Figure 2:
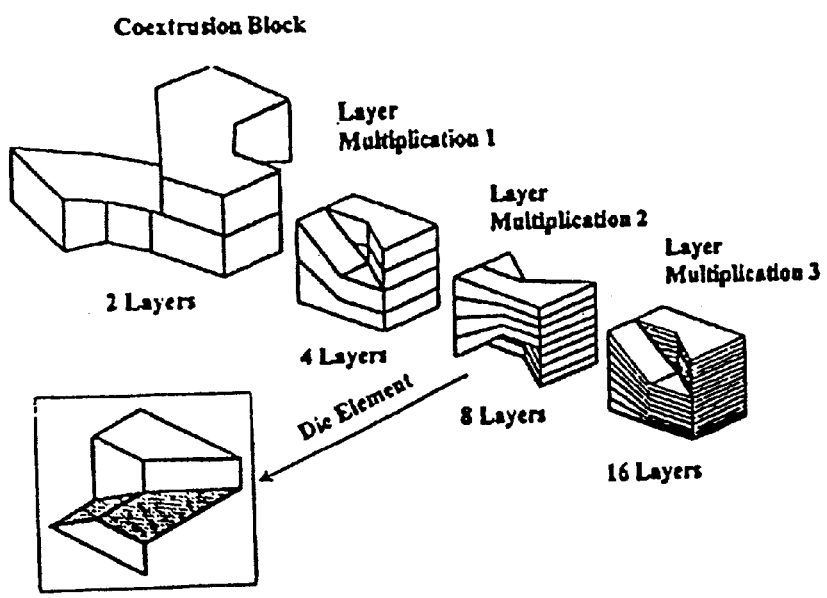
FIG. 2 shows a series of multiplying elements.

The multilayer structure of the present invention is a nonlinear dielectric optical material that has a substantial modulation in the nonlinear dielectric constant across the sample. A material with a modulation in the linear dielectric constant is commonly called a "photonic crystal" (J. D. Joannopoulos, R. D. Meade, and J. N. Winn; *"Photonic Crystals"* (Princeton Univ. Press, (1995)) when the period of the modulation is on the order of a wavelength of light. Thus the materials described here, which possess a modulation in the nonlinear dielectric constant across the sample, can be considered as ID nonlinear photonic crystals. These materials exhibit an intensity dependent transmission and reflection. They act as nonlinear mirrors and perform a variety of functions including optical switching and optical limiting.

Accordingly, it is an object of the present invention to provide a multilayer structure as nonlinear multilayer 1-D photonic crystal and a method for the fabrication of same.

In one embodiment of the present invention the multilayer structure is made of two alternating layers (ABABA . . . ) of two polymeric materials referred to as component "(a)" and component "(b)", respectively, throughout the description.

Materials

One of ordinary skill in the art will readily appreciate that a wide variety of materials can be used to form the multilayer structure of the present invention. The components comprising the different layers of the multilayer structure are polymeric materials chosen to have a difference in the index of refraction of the layers preferably on the order of from 0 to 10%, including any increments within that range, most preferably on the order of 0 to 2%. The degree of index matching is chosen to provide the desired initial level of reflectivity and to maximize the change in reflectivity with nonlinear index. By way of example, the preferred index matching for polycarbonate (PC) with a refractive index $n_0=1.583$, is for the alternate layers to be matched to within 0.004 with the nonlinear layer having the smaller index. The component comprising the alternating layers are preferably a polymeric material, a polymeric composite material, an oligomeric material, and/or a polymeric material containing a nonlinear dye. The content of the nonlinear dye in the polymeric material is preferably in the order of 0.1 to 5 wt %. Further, it is preferred that a good inter-layer adhesion between co-extruded layers is exhibited in the multilayer structure to reduce the possibility of delamination during end use.

The term "polymeric material" as used in the present application denotes a material having a weight average molecular weight (Mw) of at least 5,000. Preferably the polymeric material is an organic polymeric material. The term "polymeric composite material" as used in the present application denotes a combination of a polymeric material with at least one more material dispersed therein; the additional material can be another polymeric material or an inorganic material; examples of such inorganic materials include inorganic fillers, such as glass, titanium dioxide and talc; further, the inorganic material may be the form of particles, rods, fibers, plates etc. It is preferred that the composite material is substantially optically transparent. Accordingly, it is preferred that the dispersed material is miscible with the polymeric materials, has a refractive index substantially the same with the polymeric material or is finely dispersed to avoid light scattering. Such composite materials are a convenient and useful way to control the linear part of the refractive index in the individual layers. The term "oligomeric material" as used in the present application denotes material with a degree of polymerization (DP) between 10 and 1000. The term "nonlinear dye" as used in the present application denotes a material whose dielectric constant and hence the refractive index varies with the incident light intensity and/or the incident light fluence. The intensity or fluence dependence can be in either or both the real or imaginary part (absorptive part) of the refractive index. The term "nonlinear optical response" of a material, as used in the present application, denotes that the real and/or the imaginary part of the refractive index of the material is a function of the intensity and/or fluence of the incident light. Specifically, either the absorbance and/or the refractive index varies with the fluence (intensity). For an optical limiter, a dye with a nonlinear optical response that includes an absorbance that can increase with fluence (intensity) is particularly useful. Further, the multilayer structure of the present invention is a 1D photonic crystal in the sense that a photonic crystal is a material having a spatially periodic modulation of the refractive index. Further, the term "nanolayer" is used to denote a layer with thickness in nanoscale.

Suitable polymeric materials in accordance with the present invention include but are not limited to, polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly (isobutyl methacrylate), poly(propyl methacrylate), poly (ethyl methacrylate), poly(methyl methacrylate), poly(butyl acrylate) and poly(methyl acrylate) (the term "(meth) acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; polyether-amides. Also suitable are copolymers such as styrene-acrylonitrile copolymer (SAN), containing between 10 and 50 wt %, preferably between 20 and 40 wt %, acrylonitrile, styrene-ethylene copolymer; and poly(ethylene-1,4-cyclohexylenedimethylene terephthalate) (PETG). In addition, each individual layer may include blends of two or more of the above-described polymers or copolymers. Preferred polymeric materials include a styrene-acrylonitrile copolymer and a polycarbonate.

Nonlinear dyes can be used to confer nonlinear absorption, nonlinear refraction or both on the polymeric materials and polymer composites used in the multilayer samples. Nonlinear dyes can also be used to enhance the nonlinear optical response of polymers with an inherent nonlinear optical response. The nonlinear absorption property is obtained by using nonlinear dyes that exhibit reverse saturable absorption, sequential two-photon absorption, or two-photon absorption with sequential two-photon absorption or reverse saturable absorption being preferred. Nonlinear dyes exhibiting this property include phthalocyanines, naphthalocyanines, porphyrins, organometallic cluster compounds, and fullerenes. Some preferred materials are lead tetrakis(cumylphenoxy)phthalocyanine (PbPc(CP)$_4$), lead tetrakis(polydimethylsiloxane) phthalocyanine, tetra-tert.-butyl (para-trifluoromethyl phenyl) indium(III) phthalocyanine and bis(trihexylsiloxy)silicon naphthalocyanine. The nonlinear refraction property is obtained by using nonlinear dyes or a polymeric material that exhibits an intensity dependent refractive index. The intensity dependent refractive index can be obtained by either thermal expansion in a material with a substantial dn/dT (where n is the refractive index and T is the temperature) by optical pumping to an excited state where the excited state has a different refractive index from the ground state, by a resonant $\chi^{(3)}$ (where $\chi^{(3)}$ is the third order susceptibility) where the resonance is provided by two-photon absorption, for example, or by a nonresonant $\chi^{(3)}$.

The preferred mechanism is thermal or optical pumping. Nonlinear dyes exhibiting these properties include nigrosine, cyanines, phthalocyanines, naphthalocyanines, porphyrins, organometallic cluster compounds, carbon blacks and fullerenes. The host polymeric material contributes to the thermal mechanism, so polymeric materials with large $d\rho/dT$ (where $\rho$ is the density) are preferred. Preferred host polymeric materials include polycarbonates, polystyrenes, poly(methyl)methacrylate and polysiloxanes. The thermal nonlinearity is enhanced by the peripheral substituent on the nonlinear dye. For a thermal nonlinearity, nigrosine, and copper tetrakis(cumylphenoxy) phthalocyanine are preferred; for an optical pumping nonlinearity lead tetrakis(cumylphenoxy)phthalocyanine (PbPc (CP)$_4$ ), lead tetrakis(polydimethylsiloxane) phthalocyanine or the equivalent bis(trihexylsiloxy)-silicon naphthalocyanines are preferred nonlinear dyes.

Suitable examples of polymeric materials with inherent nonlinear response include, but are not limited to, polyacetylene, polythiophene, poly(diacetylene), poly(p-phenylene vinylene), poly(thienylene vinylene) and poly(p-phenylene benzobisthiazole).

Fabrication

The 1-D photonic crystal is then fabricated using these materials in a multilayer extrusion technique. The method preferably yields a flexible large film or sheet of multilayer nonlinear dielectric optical structure. The thickness of the individual layers is on the order of from 5 nanometers to 10 micrometers, preferably from 10 nanometers to 1000 nanometers, more preferably from 30 nanometers to 200 nanometers. They are engineered to provide reflectivity within a wavelength region between about 200 micrometers and the near UV (350 nanometers). In other words, there should be a transmission window somewhere between 200 micrometers and 350 nanometers. The term "about" is used in the present application to denote a deviation from the stated value. Preferably, the polymeric materials used in the alternating layers are transparent in the above region. The layer thickness can be varied or chirped to provide variable reflectivity over a broad band of wavelengths and acceptance angles. Preferably, the layers have substantially uniform layer thickness, where "substantially" is used to denote a deviation within 20%.

For simplicity of discussion, the behavior of a two component system is described. In this embodiment of the present invention the multilayer structure is made of two alternating layers (ABABA . . . ) of two polymeric materials referred to as component "(a)" and component "(b)", respectively, throughout the description. The components (a) and (b), may be the same or different and form a multilayer structure represented by formula $(AB)_x$, where $x=(2)^n$, and n is the number of multiplier elements. At least one of components (a) and (b) exhibits nonlinear optical response. It should be understood that the multilayer structure of the invention may include additional types of layers. The components of the various alternating layers may be the same or different as long as at least one component exhibits nonlinear optical response. For instance, a three component structure of alternating layers (ABCABCA . . . ) of components (a), (b) and (c) is represented by $(ABC)_x$, where x is as defined above.

In the two-component system described above one of the alternating layers (A) comprises component (a) which is a polymeric material with a dissolved nonlinear dye and a second alternating layer (B) comprises component (b) which is a polymeric material alone. It is desirable to adjust the composition so that the difference between the linear index of the layer containing the nonlinear dye and the linear index of the polymeric material alone is between 0 and 10% including any increments therein, preferably between 0 and 2%. The multilayer structure in the above embodiment is represented by formula $(AB)_x$, where $x=(2)^n$, and n is the number of multiplier elements.

In the embodiment described above of a two-component multilayer structure, the 1-D photonic crystal is prepared by microlayer coextrusion of the two polymeric materials. Nanolayers are comprised of alternating layers of two or more components with individual layer thickness ranging from the microscale to the nanoscale. A typical multilayer coextrusion apparatus is illustrated in FIG. 1. The two component (AB) coextrusion system consists of two ¾ inch single screw extruders each connected by a melt pump to a coextrusion feedblock. The feedblock for this two component system combines polymeric material (a) and polymeric material (b) in an (AB) layer configuration. The melt pumps control the two melt streams that are combined in the feedblock as two parallel layers. By adjusting the melt pump speed, the relative layer thickness, that is, the ratio of A to B, can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements. It is understood by those skilled in the art that the number of extruders used to fabricate the structure of the invention equals the number of components. Thus, a three-component multilayer (ABC . . . ), requires three extruders.

The multilayer structure of the present invention preferably has at least 30 layers, including any number of layers within that range. Preferably, the multilayer structure of the present invention has from 50 to 10000 layers. Preferably, the multilayer structure is in the form of film or sheet. By altering the relative flow rates or the number of layers, while keeping the film or sheet thickness constant, the individual layer thickness can be controlled. The multilayer structure film or sheet has an overall thickness ranging from 10 nanometers to 1000 mils, preferably from 0.1 mils to 125 mils and any increments therein. Further, the multilayer structures may be formed into a number of articles. The structures may be formed by coextrusion techniques initially into films or sheets which may then be post formed. Such post forming operations may include thermoforming, vacuum forming, or pressure forming. Further, through the use of forming dies, the multilayer structures may be formed into a variety of useful shapes including profiles, tubes and the like.

Structures exhibiting unique optics can be produced with microlayer processing technology. The present inventors have found that layering improves the nonlinear optical response of a multilayer structure. In other words, the larger the number of layering the better the nonlinear optical response of the multilayer structure. In accordance with the present invention, when two materials of differing refractive indices are extruded into a multilayer structure that has layer thickness of approximately ¼ the wavelength of visible light, the material will be reflective. Increasing the number of layers increases the number of interfaces, and thus amplifies the reflective response.

Figure 3:
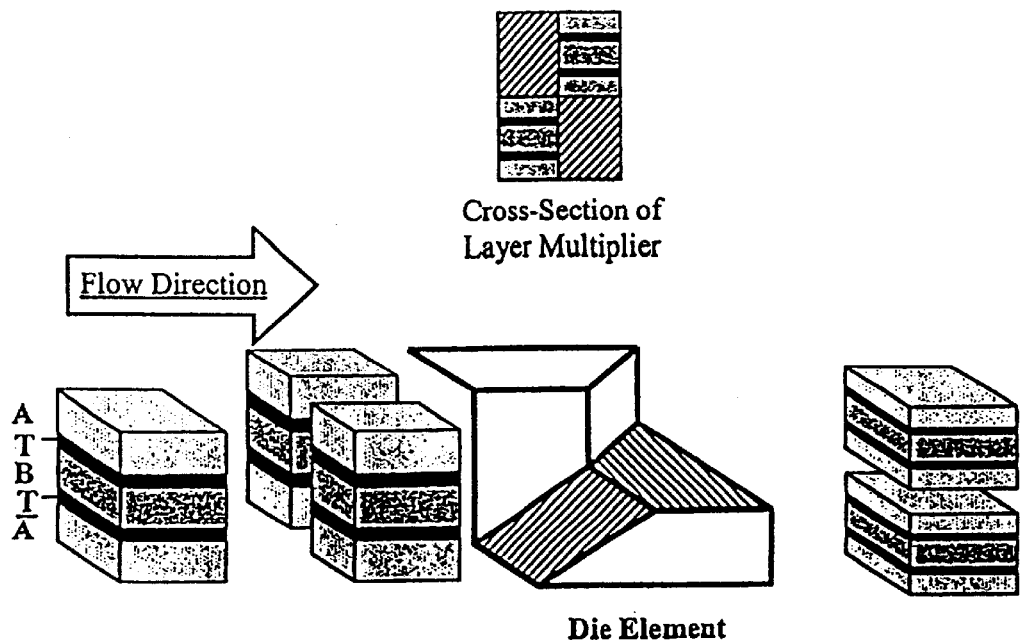
FIG. 3 is a schematic representation of a flow diagram for a three layer system (A), (B) and (T), where (T) is a tie layer.

In another embodiment of the invention, a third polymeric layer is placed in the multilayer structure as a tie layer, barrier layer or toughening layer. A multilayer structure containing a third component exhibits improved properties such as mechanical properties. Thus, a three component multilayer structure expands the utility of the two component nanolayer structure. When the third polymer layer is a barrier layer, it is present as a single layer on one or both exterior major surfaces of the structure or as an interior layer. For example, suitable barrier layer materials such as hydrolyzed ethylene vinyl acetate, copolymers of polyvinylidene chloride, nitrile polymers, and nylons may be used in or on the multilayer body. Suitable adhesive materials such as maleic anhydride grafted polyolefins may be used to bond such barrier layer materials to the multilayer structure. Alternatively, a third polymeric layer may be used as a surface or skin layer on one or both major exterior surfaces. The skin layer may serve as scratch resistant, weatherable protective layer, as sacrificial layer or as decorative layer. Further, such skin layers may be post applied to the structure after coextrusion. A typical three component system according to the above embodiment is illustrated in FIG. 3. A tie layer (T) is inserted between layer (A) and layer (B) by using a five layer feedblock. The five layer melt is sliced, then spread and recombined to give a layer sequence $(ATBT)_xA$, where x is equal to $(2)^n$ for an assembly of n multiplier elements. The additional polymeric layer may be a barrier layer Nonlinear Response Thermal changes in the index of refraction are generally largest. These require a nonlinear dye that converts the absorbed energy to heat efficiently and rapidly and a polymeric material host that has a large change in index or refraction with temperature. Nigrosine is a typical example of this class of nonlinear dyes. Another class of materials that can be used as the nonlinear dye is a phthalocyanine, a porphyrin and a naphthalocyanine (H. S. Nalwa, and J. S. Shirk, "Nonlinear Optical Properties of Metallophthalocyanines" in Phthalocyanines: Properties and Application, C. C. Leznoff and A. B. P. Lever, Eds., VCH Publishers, New York, 4, 79 (1996)). Nonlinear dyes of this type are appropriate if they are substituted at the peripheral or axial positions to provide solubility and compatibility with the polymeric material host. $PbPc(CP)_4$ in a styrene/acrylonitrile copolymer host is an example. These nonlinear dyes usually possess a nonlinear absorption as well as a nonlinear refraction, so the absorption increases with the incident fluence. The increasing absorption serves to enhance the thermal nonlinear mechanism. It also makes these materials particularly suitable for use as optical limiter.

Optical Switches

Figure 13:
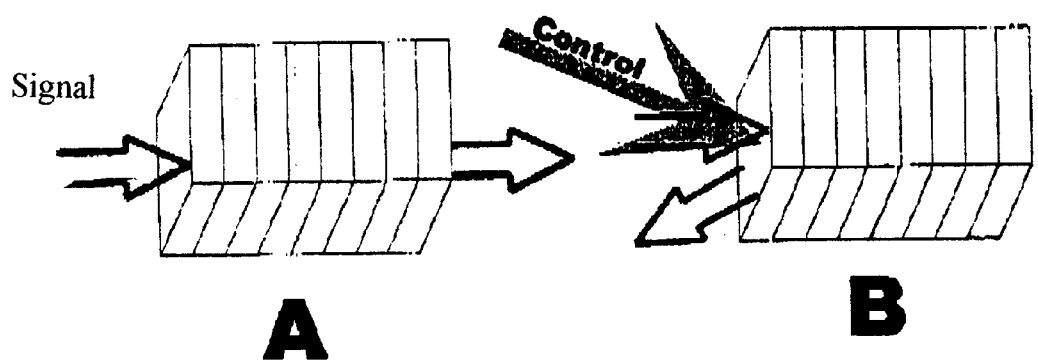
FIG. 13 is a schematic representation of a multilayer optical switch in accordance with the present invention. Initially, the refractive indices of the different layers are close to being matched, and the sample transmission is high (A). When the control beam is present (or the signal beam becomes sufficiently intense), the refractive index of the layers is not matched. The resulting index modulation makes the material an effective dielectric mirror (B). The reflectivity increases and the transmission falls.

The nanolayered materials of the present invention can act as optical switches. The basic principle for nonlinear reflection using the nanostructured material can be understood from FIG. 13. The optical switch consists of alternate layers of a linear polymer and a polymer whose index of refraction varies with light intensity. Initially, the refractive indices of the different layers are close to being matched, and the sample transmission is high (A). When the control beam is present, the refractive index of the layers is not matched. The resulting index modulation, with a spacing of $\lambda/4$, makes the material an effective dielectric mirror (B). The increased reflectivity will cause the signal beam to be reflected.

These materials can also be self-acting switches. If the signal beam becomes sufficiently intense, it will cause the reflectivity to increase and the transmission to fall. This property is useful for optical limiting applications.

The response time of the optical switches, in accordance with the present invention, is preferably at least 20 femtosecond, more preferably on the order of 1 to 1000 picoseconds, and most preferably between 10 to 500 picoseconds, including any increments within the above ranges.

Optical Limiters

In another embodiment of the present invention, the multilayer structure of the can be used as an optical limiter. A material that has the multilayer structure of the present invention will provide a limiting effect superior to that found in equivalent homogeneous materials. In current optical limiters, nonlinear absorption, nonlinear refraction and nonlinear scattering all are contributing mechanisms. Nonlinear absorption, where the material absorbance increases with the intensity of the incident light, is a good mechanism to remove light from the transmitted beam. Nonlinear refraction can be used to deflect or scatter light out of the transmitted beam, thereby decreasing the device transmission. When the nonlinear material has a refractive index that depends on the light intensity or fluence, the intensity distribution across the beam generates a refractive index variation in the nonlinear material that behaves as a lens with strong aberrations. This lens will deflect some of the light into the wings of the transmitted beam where an exit aperture blocks it. This serves to limit the energy in the transmitted beam at high input fluences.

All these optical limiting mechanisms will be effective when the limiter material possesses the multilayer structure of the present invention. In addition, the multilayer structures will provide an optical switching mechanism, as described above, that will contribute to and enhance the optical limiting. Further, the multilayer structure will provide enhanced nonlinear absorption, since the internal reflections induced within the multilayer structure will increase the effective path length, and reduce the transmission.

Following is a comparison of the present invention with the structure of the Norwood et al. publication (R. A. Norwood et al.; *Opt. Lett.* 17, 577 (1992)). The Norwood et al structure used 23 layers of a copolymer of silicon naphthalocyanine/methyl methacrylate alternating with methyl methacrylate. The layers were constructed via spin coating. The mechanism of the nonlinear response was saturable absorption. This mechanism leads to a strong absorption at the operating wavelength. Accordingly:

1. The highly absorbing nonlinear layer limits the number of layers that can be used. This makes the structure much more susceptible to optical damage. Damage was reported at 15–20 MW/cm$^2$ for the Norwood structure. In contrast, the multilayer polymer of the present invention reflectors can sustain greater than 500 MW/cm$^2$.
2. The limited number of layers possible means the Norwood et al device can have only a narrow band reflectivity. The small number of layers that are possible means that this device cannot achieve a large reflectivity over more than about 20–30 nm. Multilayer samples can exhibit a reflectivity greater than 500 nm.
3. The Norwood device gives an increase in transmission and a decrease in reflection with increasing intensity. This response is not useful as a transmission optical limiter. Further, the narrow band reflectivity and the strong absorption at the reflecting wavelength are not useful in a limiter. Multilayer samples show an increase in reflectivity and a decrease in transmission with increasing incident intensity at wavelengths where the low intensity transmission can be greater than 80%.
4. The Norwood et al structure as an optical switch has large absorption losses and the peak of only 20% reflectivity at the operating wavelength. By contrast, the multilayer structure of the present invention, operating as optical switches, have greater than 95% reflectivity with absorption losses of less than 1%. The latter makes a more efficient optical switch that can be operated at much higher rates.
5. The extrusion technique is capable of making much larger dimensioned multilayer structures of a much wider variety of materials. It also allows the easy fabrication of many more layers than the spin coating technique. Extrusion also permits faster and more economical fabrication than stepwise spin coating. Since spin coating requires that the alternate layers be relatively insoluble, it is not feasible to prepare multilayer structures with polymeric materials containing a soluble dye.

Having generally described this invention, a further understanding can be obtained by reference to certain specific examples which are provided herein for purposes of illustration only and are not intended to be limiting unless otherwise specified.

EXAMPLES

Non-linear dielectric optical structures were made by coextruding 4096 nanolayered sheets of alternating dyed and undyed poly(styrene-co-acrylonitrile). Base refractive indices were tailored by choosing poly(styrene-acrylonitrile) copolymer (SAN) materials with differing acrylonitrile content. Layer thickness in the range of 100 nm were processsed fabricating 1-D photonic crystals.

System:2 component.

Number Of Layers: 4096

| | | Composition | |
|---|---|---|---|
| | Materials | 50/50 | 0/100 |
| 1 | SAN 20/SAN 25 + 0.2 wt % Nigrosine Dye | 5,14 mils | — |
| 2 | SAN 20/SAN 25 + 1 wt % Lead Dye[1] | 14 mils | — |
| 3 | PC/PC + 0.2 wt % Nigrosine Dye | 5,14,20 mils | 20 mils |
| 4 | PC/PC + 1 wt % Lead Dye[1] | 5,14 mils | — |

[1]lead tetrakis(cumylphenoxy)phthalocyanine
SAN 20 denotes a copolymer of styrene-acrylonitrile containing 20 wt % of acrylonitrile, TYRIL 100 manufactured by Dow; SAN 25 denotes a copolymer of styrene-acrylonitrile containing 25 wt % of acrylonitrile, TYRIL 990 manufactured by Dow.
The polycarbonate was CALIBRE 200-14 manufactured by Dow.

Details of the Mixing Procedure(Polymer-Dye)

A counter rotating intermeshing twin screw extruder was used for mixing the polymeric material and the nonlinear dye.

| | Materials | Mixing Temperature (° C.) | Mixing Speed (rpm) |
|---|---|---|---|
| 1 | SAN + 0.2 wt % Nigrosine Dye | 230 | 25 |
| 2 | SAN + 1 wt % Lead Dye[1] | 220 | 25 |
| 3 | PC + 0.2 wt % Nigrosine Dye | 257 | 21 |
| 4 | PC + wt % Lead Dye[1] | 257 | 21 |

[1]lead tetrakis(cumylphenoxy)phthalocyanine
SAN 20 denotes a copolymer of styrene-acrylonitrile containing 20 wt % of acrylonitrile;
SAN 25 denotes a copolymer of styrene-acrylonitrile containing 25 wt % of acrylonitrile.

Details of Multilayer Coextrusion

Extruders

Make—KILLION Extruders Inc.

Size—¾"

L/D ratio—24:1

Melt Pumps

ZENITH Pumps Inc.

Capacity—1.2 cc/hr

Multipliers

Long multipliers were used.

# of multipliers—11

Die

A 3" die was used.

Processing Conditions

| 1. SAN 20/SAN25 + 0.2 wt % Nigrosine Dye | |
|---|---|
| | Temperature (° C.) |
| Barrel Zone #1 | 200 |
| Barrel Zone #2 | 220 |
| Barrel Zone #3 | 230 |

-continued

| | |
|---|---|
| Clamp | 230 |
| Adapter | 230 |
| Pump | 230 |
| Multipliers | 210 |
| Exit Die | 230 |

| | Extruder 1 | Extruder 2 |
|---|---|---|
| Screw Speed (rpm) | 35 | 24 |
| Pump Speed (rpm) | 20 | 20 |

2. SAN 20/SAN 25 + 1 wt % Lead Dye[1]

| | Temperature (° C.) |
|---|---|
| Barrel Zone #1 | 230 |
| Barrel Zone #2 | 250 |
| Barrel Zone #3 | 265 |
| Clamp | 265 |
| Adapter | 265 |
| Pump | 265 |
| Multipliers | 220 |
| Exit Die | 240 |

| | Extruder 1 | Extruder 2 |
|---|---|---|
| Screw Speed (rpm) | 25 | 31 |
| Pump Speed (rpm) | 20 | 20 |

[1]lead tetrakis(cumylphenoxy)phthalocyanine
SAN 20 denotes a copolymer of styrene-acrylonitrile containing 20 wt % of acrylonitrile;
SAN 25 denotes a copolymer of styrene-acrylonitrile containing 25 wt % of acrylonitrile.

3. PC/PC + 0.2 wt % Nigrosine Dye

| | Temperature (° C.) |
|---|---|
| Barrel Zone #1 | 220 |
| Barrel Zone #2 | 250 |
| Barrel Zone #3 | 270 |
| Clamp | 270 |
| Adapter | 270 |
| Pump | 270 |
| Multipliers | 210 |
| Exit Die | 220 |

| | Extruder 1 | Extruder 2 |
|---|---|---|
| Screw Speed (rpm) | 27 | 32 |
| Pump Speed (rpm) | 17 | 17 |

4. PC/PC + 1 wt % Lead Dye[1]

| | Temperature (° C.) |
|---|---|
| Barrel Zone #1 | 208 |
| Barrel Zone #2 | 242 |
| Barrel Zone #3 | 253 |
| Clamp | 253 |
| Adapter | 253 |
| Pump | 253 |
| Multipliers | 190 |
| Exit Die | 200 |

| | Extruder 1 | Extruder 2 |
|---|---|---|
| Screw Speed (rpm) | 3.5 | 3.8 |
| Pump Speed (rpm) | 7.0 | 7.0 |

[1]lead tetrakis(cumylphenoxy)phthalocyanine

A description of the linear and nonlinear optical properties of some nanolayer polymeric structures fabricated by the extrusion method follows. Further, it was shown that the multilayer films exhibit a broadband reflectivity in the visible with relatively small index differences between the layers. It was then shown that the nonlinear nanolayered materials of the present invention exhibited a transmission and reflectivity that varied with the intensity or fluence of an incident beam. The layered film behaves as a nonlinear ID photonic crystal.

Experimental Apparatus

The samples of the ID photonic materials and control samples were cut directly from the extruded material. Some samples were mounted between microscope slides using an optical cement. Mounting reduced scattering from the surface of the extruded polymeric materials. Absorption spectra of each of the samples were recorded on a PERKIN-ELMER LAMBDA 9 spectrophotometer. Absorption spectra of small regions of the samples were recorded using an OCEAN OPTICS fiber optic spectrometer. Reflection spectra were recorded using the fiber optics spectrometer with a reflectance probe.

Figure 4:
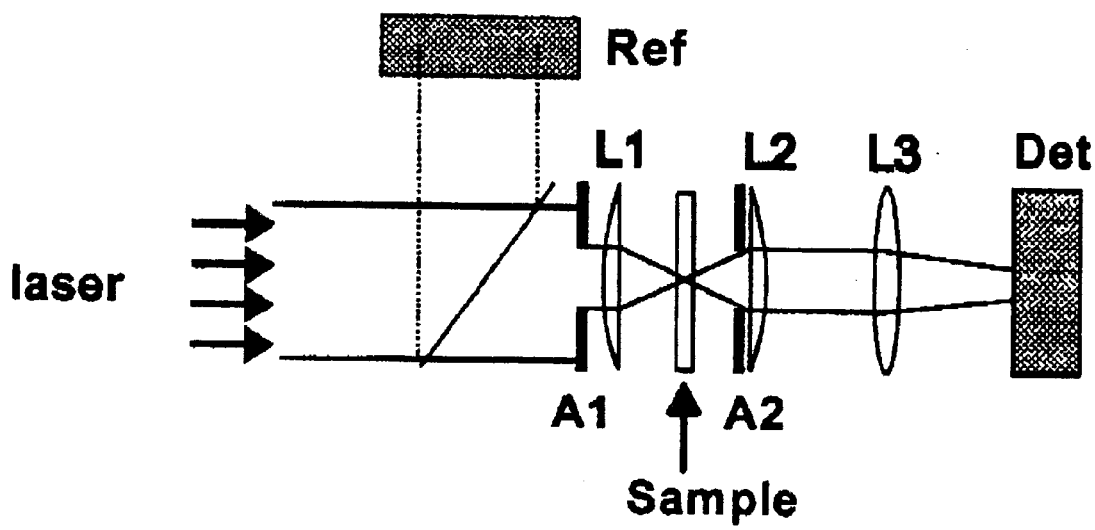
FIG. 4 shows the nanosecond transmission apparatus. The sample is mounted on a translation stage near the focus. A1 and A2 are the entrance and exit apertures L1, L2 and L3 are lenses used to focus the light on the sample film, recollimate it and weakly focus it on the detector (Det). Ref is the reference detector.

The nanosecond transmission and reflection experiments were performed using the apparatus shown in FIG. 4. The samples were mounted on a translation stage near the focus of a laser. The laser source for the nanosecond experiments was an optical parametric oscillator (OPO) pumped by the third harmonic of a Nd/YAG laser. The pulse width was 2.5 nanoseconds. Some of the nanosecond experiments at 532 nm used a doubled Nd/YAG laser with an 8 nanosecond pulse width. In both cases, the input beam was spatially filtered to give a spatial profile that typically showed a greater than 96% correlation with a gaussian profile. The laser intensity was controlled by several wave plate/polarizer combinations in series.

The experiments at low energies were conducted at a 10 Hz repetition rate. For incident fluences above 10 mJ/cm$^2$, the repetition rate was reduced to 0.5 Hz in order to reduce any effect due to persistent heating.

Two different sets of focusing optics were used. In the first, the input beam was focused using approximately f/45 optics. The focal spot size, f/number, and the beam quality were determined from knife edge scans at several positions along the beam path near the focus. The measured $M^2$ increased from 1.1 at 530 nm to 1.3 at 610 nm. A diffraction limited gaussian beam would have $M^2=1$. The measured focal spot size was within about 10% of that expected for a gaussian beam between 530 nm and 610 nm. The second set of optics was f/S focusing optics. The input laser beam was expanded so that only the first aperture transmitted the central 10% of the beam. This gives the beam an approximately flat top intensity profile. The lens L1 was a corrected multiplet, which focused the light to a spot with a measured beam radius of 2.5±0.1 $\mu$m at 532 nm. This was close to the expected radius for a diffraction-limited spot size, which is 2.2 $\mu$m. With the OPO as a source, the beam radius was measured to be 2.6±0.1 $\mu$m at 550 nm.

In both cases, the light passing through the sample was recollimated by L2 and focused by lens L3 onto the detector. With no exit aperture (A2), lens L2 in the second optics set provided approximately f/0.8 collection optics. The film was mounted on a translation stage and translated through the focus for the Z-scan experiments. For nonlinear transmission measurements, the position was adjusted about the focus to give the smallest transmitted energy for incident energies near the limiting threshold.

In the reflection experiments, the sample was rotated so that angle of incidence was about 10°. A small pickoff mirror was used to direct reflected light to a third detector next to the reference detector.

Optical switching measurements were made by measuring the reflectivity of a multilayer sample as a function of time after a separate pump beam was incident on the sample. The picosecond (ps), time resolved, experiments were performed using a dye laser that is synchronously pumped by the second harmonic of a CW mode-locked Nd: YAG laser. The dye laser output is amplified in a three-stage dye amplifier pumped using the second harmonic of a regenerative Nd: YAG amplifier seeded with the fundamental of the mode-locked Nd: YAG laser. The 10 Hz output of the laser system provides 1.2 ps FWHM pulses with energies up to 1 mJ. It was tuned near 590 nm for these experiments. The beam is split into two or three beams that can be used as pump and probe beams. The intensity of the beams is varied using waveplate/polarizer combinations. The timing between the arrival of the beams at the sample is achieved by variable optical delay lines. The apparatus is modified from a degenerate four-wave nixing apparatus that has been described in detail in Shirk et al (Shirk, J. S.; Lindle, J. R.; Bartoli, F. J.; Boyle, M. E., *J. Phys. Chem.*, 96, 5847 (1992)) and Flom et al. (Flom, S. R.; Pong, R. G. S.; Bartoli, F. J.; Kafafi, Z. H. *Phys. Rev. B*, 46, 15598 (1992)) both of which are incorporated herein by reference.

The reflectivity measurements were made by overlapping a variable intensity pump beam with a probe beam at the sample. The probe beam was normal to the polymer surface. The pump beam was incident at 13° from normal to the surface of the film. The reflectivity of the film was measured with a detector at the specular reflection angle Time resolution is obtained by varying the optical path of the pump beam. Additional experiments were performed with the pump beam normal to the surface of the multilayer sample and the probe beam at 13° from normal.

Results

Polycarbonate/poly(methyl methacrylate) ID photonic crystals

Nanolayered films with alternating polycarbonate (PC) layers and poly(methyl methacrylate) (PMMA) layers with equal thickness were prepared. These had from 32 to 4096 layers and the individual layer thickness varied from 12 nm to several microns. These film samples were up to 12 inches wide and several feet long. The refractive index of PC is about 1.58 and that of PMMA is about 1.49. This index contrast is large enough so that films with a layer thickness between 65 nm and 115 nm exhibit a strong visible reflection. Qualitatively, those films where the band gap fell in visible showed a broad, strong, reflectivity in the visible that was obvious on visual inspection. These films had a silvery appearance. Those films where the layers were much thinner or thicker appeared transparent and showed only the Fresnel reflectivity of a few percent.

Styrene-Acrylonitrile Copolymer 1D Photonic Crystals

Several nonlinear nanolayered polymeric films were fabricated. The first were made of SAN25, a styrene-acrylonitrile copolymer with 25% acrylonitrile. A nonlinear response was introduced into the alternate layers of SAN25 by dissolving a nonlinear dye in the polymeric material. The nonlinear dyes used were PbPc(CP)$_4$ and nigrosine. The nigrosine has a broad absorption in the visible and an excited state that relaxes on the sub-picosecond time scale with the conversion of the absorbed energy into heat. The resulting rise in temperature caused a thermal change in the refractive index of the host polymeric material. The nigrosine dyed SAN is an example of a thermal refractive nonlinear material. Multilayer films consisting of layers of SAN25 doped with a nonlinear dye alternating with an undyed SAN20 polymer (styrene-acrylonitrile with 20% acrylonitrile) layer were also fabricated. The refractive index of the SAN20 was about 0.0045 larger than that of SAN25. Dissolving nigrosine dye in the SAN25 polymer raised the refractive index by approximately 0.003. Thus using SAN20 in the linear layers gave a better index matching with the dyed layer of the film.

Linear Optical Properties of the SAN Films

Figure 5:
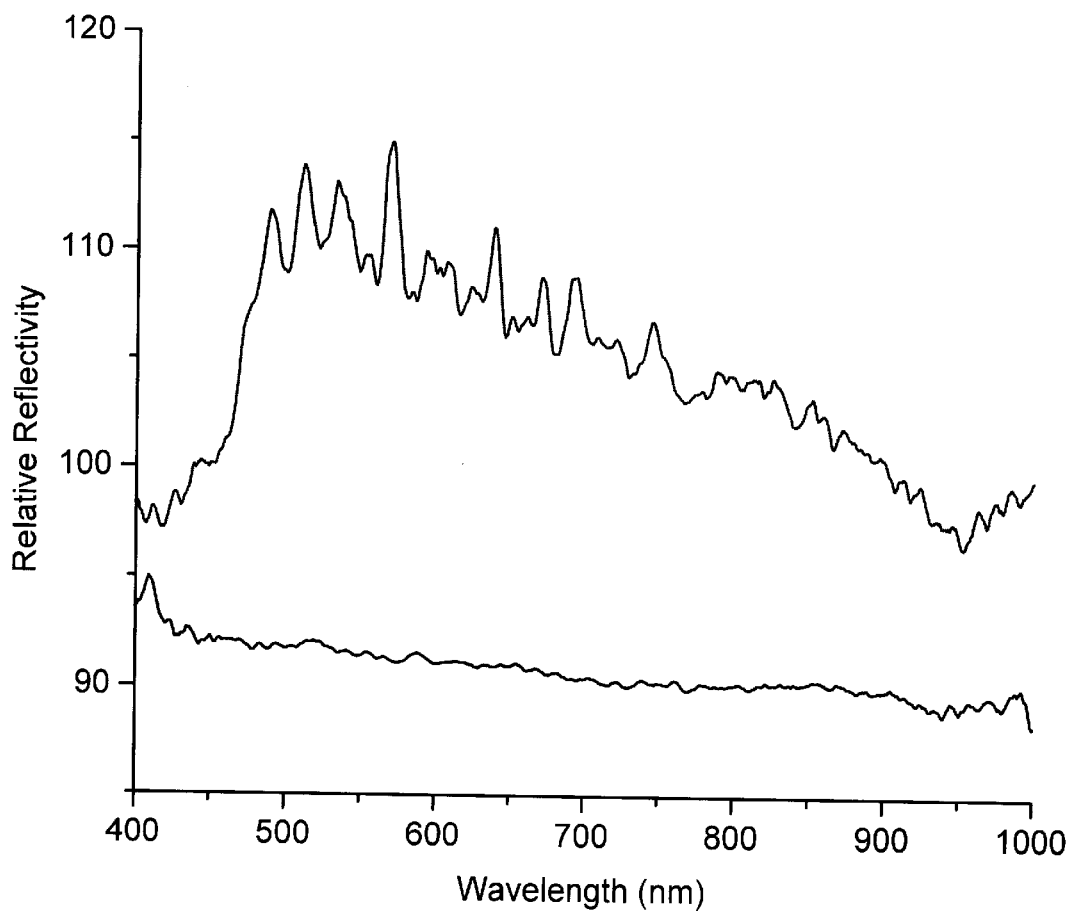
FIG. 5 shows the reflection spectra of 5 mil and 14 mil nanolayered SAN25/SAN20 films

One of the control samples had alternate layers of SAN20 and SAN25 with no dye in either layer. The index difference between the layers was about 0.003. This nanolayered film illustrates the broadband reflectivity that can be achieved with small index differences. FIG. 5 shows the reflection spectrum of two of these materials, The one labeled 14 mil had 4096 layers with an average thickness of 87 nm and that labeled 5 mil had 4096 layers with an average thickness of 31 nm. The film with 87 nm layers had a first order band gap in the visible., It shows a strong broad reflection in this region. The film with 31 nm layers showed a flat reflection spectrum. The first order band gap for this film occurs near 197 nm, deep into the UV. The narrow spikes on the reflection spectrum of the 87 nm spacing (14 mil) arise because of the distribution of the layer thickness across the sample.

Figure 6:
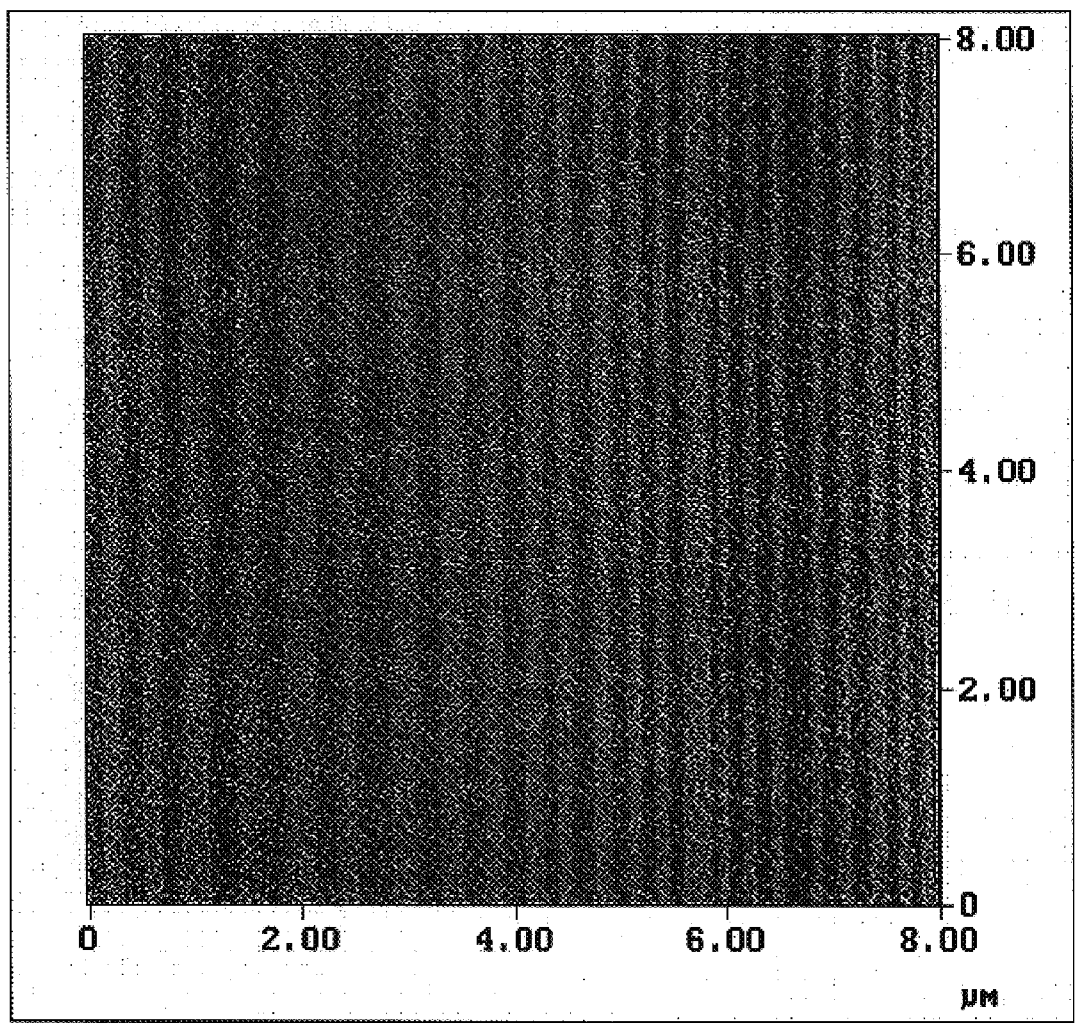
FIG. 6 shows the Atomic Force Microscopy (AFM) phase image of nanolayered SAN25+ nonlinear dye/SAN20 film

A similar SAN25/SAN20 multilayered film was carefully cleaved perpendicular to the plane of the film. The thickness of the individual layers was then measured by atomic force microscopy (AFM). The AFM image is shown in FIG. 6. This figure shows the layer structure clearly. It also shows that there is a distribution of layer thickness across the sample. In this film the layer thickness distribution is qualitatively consistent with the width of the band gap observed in the reflection spectrum (FIG. 5). Relatively broad band gaps are essential for optical limiter applications. For other optical applications it will be desirable to adjust the fabrication technique to reduce the band gap width.

Figure 7:
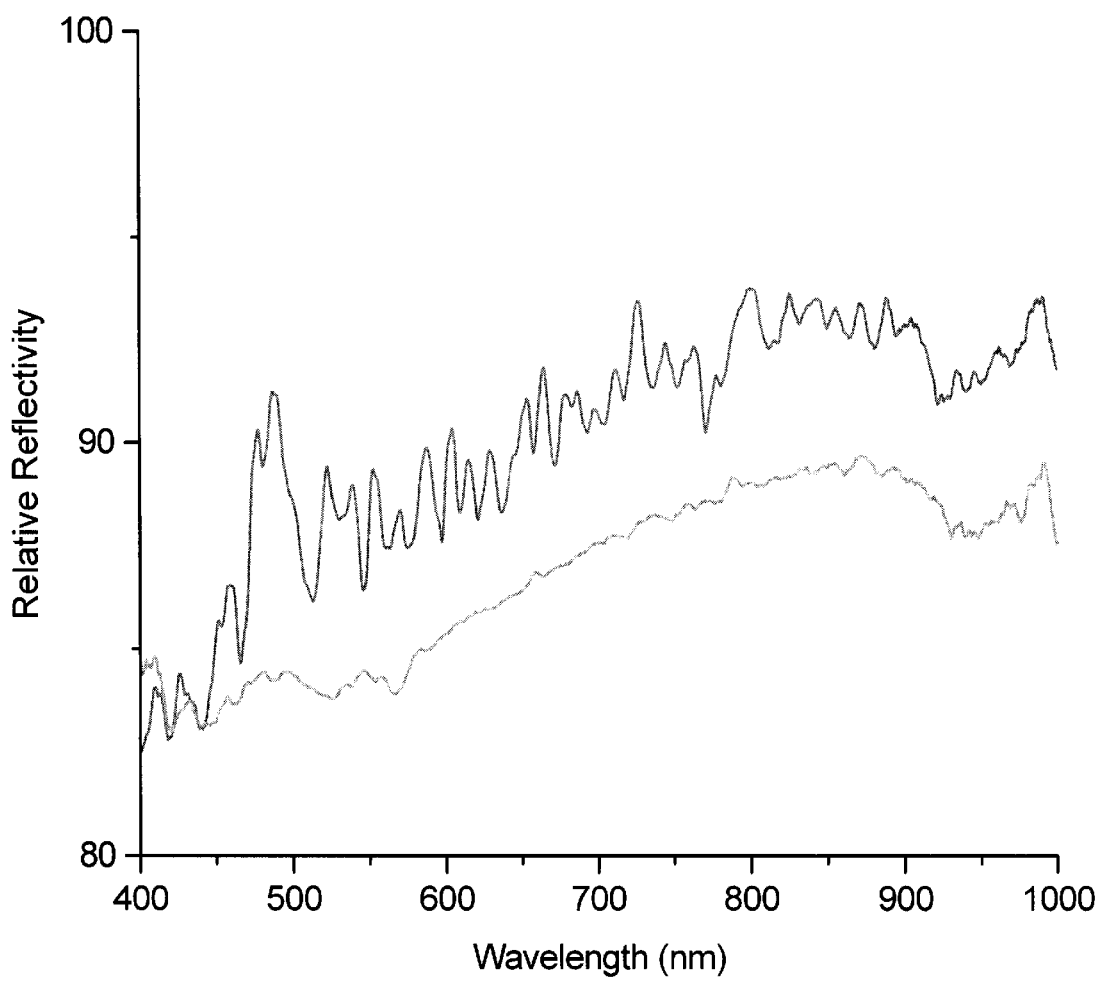
FIG. 7 shows the reflection spectra of 4096 layer SAN20/ SAN25+ nonlinear dye films with different layer thickness. In the upper spectrum the average layer thickness is 87 nm, in the lower it is 31 nm.

The reflection spectrum of multilayer films where the SAN25 layers were dyed with nigrosine is shown in FIG. 7. The films have approximately the same layer thickness as the films shown in FIG. 5. The film with an 87 nm average layer thickness showed a similar band gap to the undyed film but with a lower reflectivity in the band gap. The nigrosine dye increases the index of the SAN25 layer so the refractive index contrast was smaller.

Nonlinear Optical Studies of the SAN Films

Figure 8:
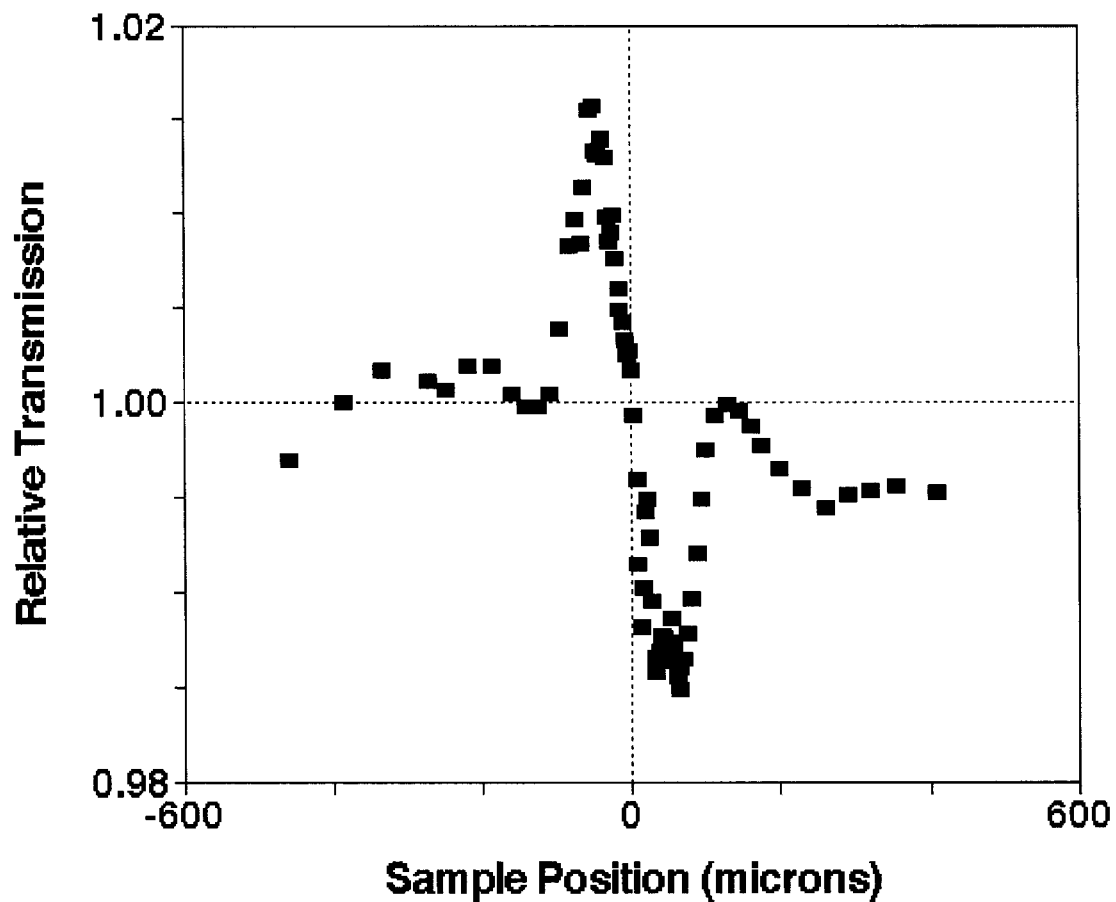
FIG. 8 shows the closed aperture Z-scan of multilayer nonlinear film of polymeric material at 532 nm. The film shows a negative nonlinear refractive index change with incident fluence.

Nanosecond nonlinear transmission and Z-scan experiments were performed on a multilayer film consisting of alternate layers of an undyed SAN polymer and the same polymer containing 0.1% (wt/wt) nigrosine. The film had 4096 layers and the average thickness of the layers was 93 nm. The open aperture Z-scan showed no variation in transmission with position, as expected, since this film has no nonlinear absorption. FIG. 8 shows the transmission of this film for a closed aperture (40% transmitting) Z-scan. This demonstrates a nonlinear refraction in this sample. The shape of the scan indicates a decrease in refractive index with fluence. This is the sign expected for the thermal nonlinearity in the dyed layers.

Figure 9:
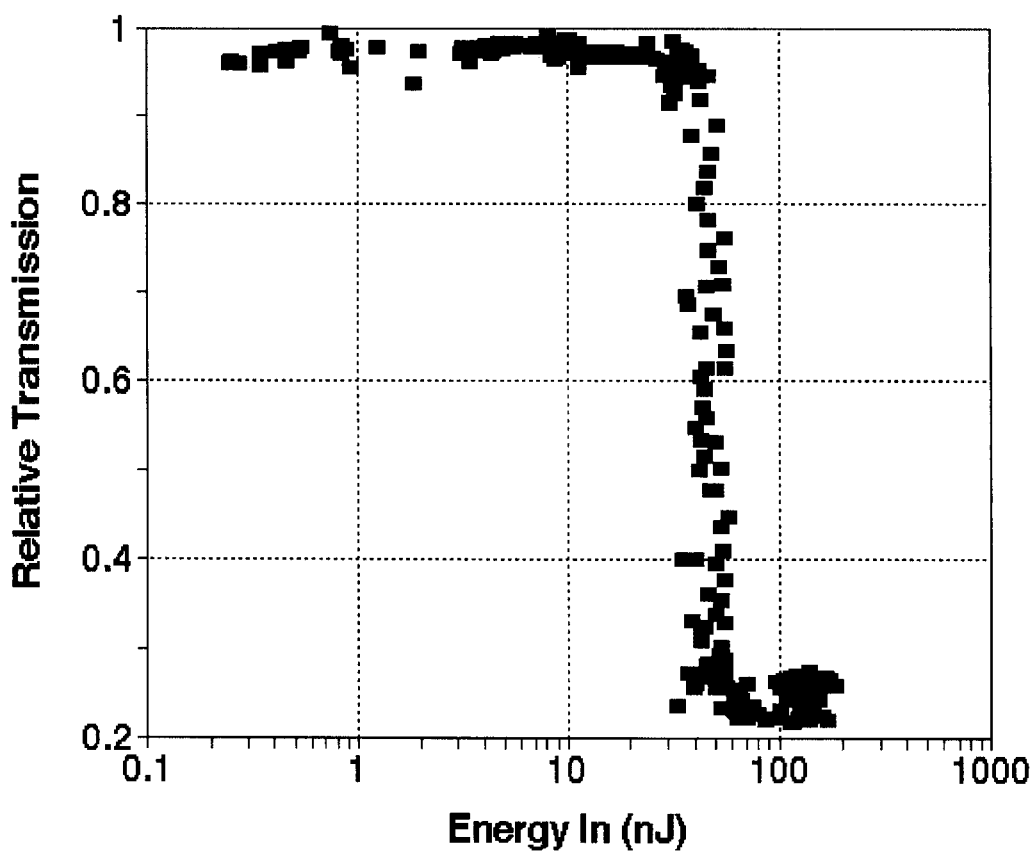
FIG. 9 shows Transmission vs. Energy for a nigrosine dyed nanolayered film at 532 nm. The film had 4096 layers with an average thickness each of 87 nm.

The relative transmission of this film as a function of incident energy in an f/5 optical limiter is shown in FIG. 9. In this experiment, the laser beam was brought to a focus at the center of the multilayer film. The transmission was approximately constant until a threshold was reached. After the threshold, the transmission dropped rapidly to a transmission below 25%. The experiment shown in FIG. 9 was performed using a 0.5 Hz laser repetition rate. The same transmission changes were observed with a 10 Hz repetition rate. This means the transmission changes are not due to persistent local heating of the sample. However, refractive index changes in the polymeric material with a relaxation time of greater than 2 seconds can contribute to the observed response.

Figure 10:
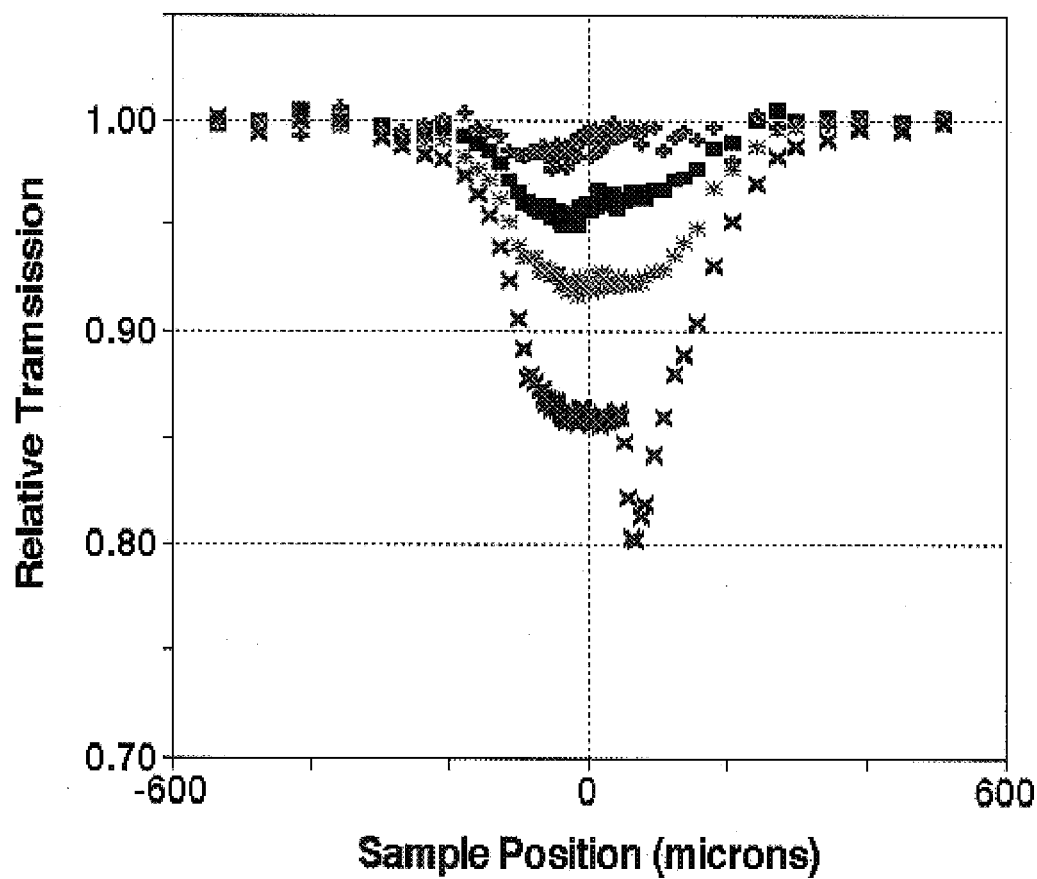
FIG. 10 shows Open Aperture Z-scan for a lead tetrakis (cumylphenoxy)phthalocyanine $(PbPc(PC)_4)$ dyed multilayer film at 532 nm.

Another 1D nonlinear photonic crystal film consisted of alternate layers of an undyed SAN25 polymer and the same polymer with 0.5% (wt/wt) lead tetrakis(cumylphenoxy) phthalocyanine (PbPc(CP)$_4$). It was a 4096 layer film with an average layer thickness of 93 nm. The lead tetrakis (cumylphenoxy)phthalocyanine dye was substantially molecularly dispersed in the polymeric material. An open aperture Z-scan recorded as a function of increasing energy on this sample in an f/5 optical system at 532 nm was shown in FIG. 10. This figure shows transmission as a function of film position at increasing input fluences. This shows that this multilayer film exhibits a strong nonlinear absorption. This is in addition to the nonlinear refraction that appears in the nigrosine dyed sample. At the highest energy shown, an additional drop in transmission is seen that is consistent with a nonlinear refraction contribution.

Polycarbonate Nonlinear 1D Photonic Crystals

Figure 11:
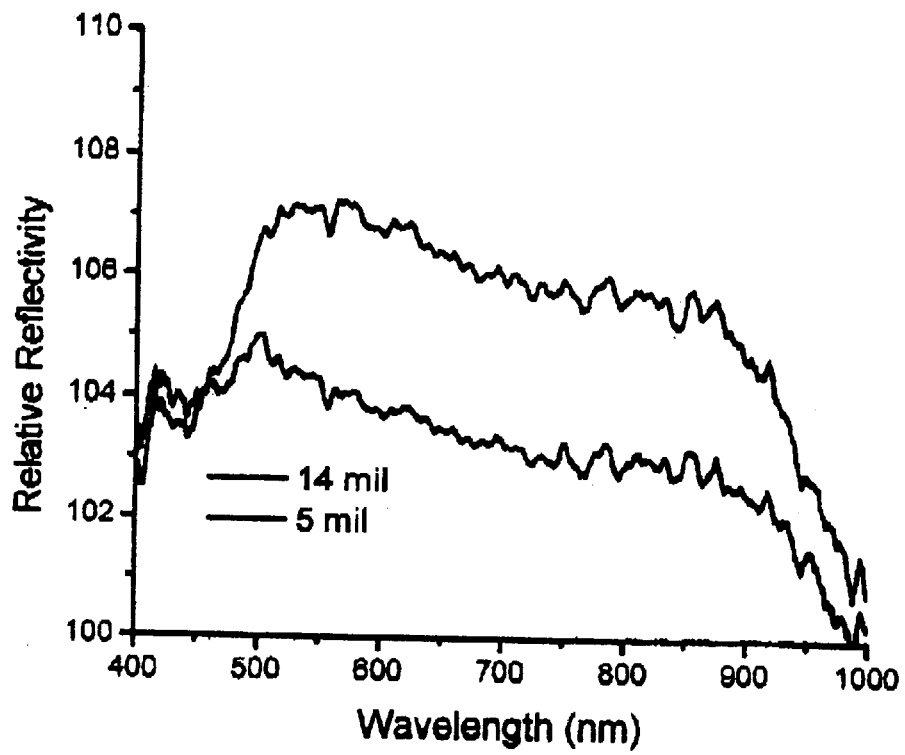
FIG. 11 shows reflection spectra of 4096 layer polycarbonate/polycarbonate+nigrosine dye films with different layer thickness.

Several nonlinear nanolayered polymeric films were fabricated using a polycarbonate host. The nonlinear response was introduced into the alternate layers by dissolving nigrosine or lead tetrakis(cumylphenoxy)phthalocyanine (PbPc(CP)$_4$) dye in the polymeric material used for those layers. In these films, the same polymeric material was used for the dyed and undyed layer. The nonlinear dye causes a slight increase in the refractive index of the dyed layer, so index of refraction of the dyed layers was slightly greater than that of the undyed layer. This led to a small linear reflectivity of the films in the band gap. This is shown in FIG. 11 which gives the reflection spectrum of two multilayer films consisting of alternate layers of an undyed polycarbonate and the same polymeric material with 0.2% (wt/wt) nigrosine. In this figure, the reflectivity of a 14 mil film with an average layer thickness of 87 nm shows a broad reflectivity in the 500 nm to 900 nm region. This reflectivity was absent in the 5 mil film with a layer thickness of 31 nm.

Nonlinear Optical Studies of the Polycarbonate 1D Photonic Crystal Films

Nanosecond nonlinear transmission and Z-scan transmission experiments were performed on the first multilayer film shown in FIG. 11. It consisted of alternate layers of an undyed polycarbonate and the same polymeric material with 0.2% (wt/wt) nigrosine. The film had 4096 layers and an average layer thickness of 87 nm. The nonlinear transmission of this film was compared to a similar film in which all the layers were dyed. In the latter film there was no modulation in the nonlinear properties across the sample.

In order to measure the nonlinear reflectivity, the sample was mounted on a translation stage and positioned near the focus of the f/45 optical system. The film was translated through the focus and the reflectivity was measured as a function of distance from focus. This is a convenient way to measure the fluence or intensity dependence of the reflectivity since the intensity and fluence of the beam vary with the distance from the focus. The result is shown in the lower plot in FIG. 12. There is about a 10% drop in reflectivity as the sample comes to the focus. This was expected since the dyed layers initially had a larger index than the undyed layers and the change in index of refraction with fluence is negative. The reflectivity should decrease and the transmission should rise as the layers came closer to being index matched. In this experiment, the transmission of the multilayer film did increase with incident fluence.

Figure 12:
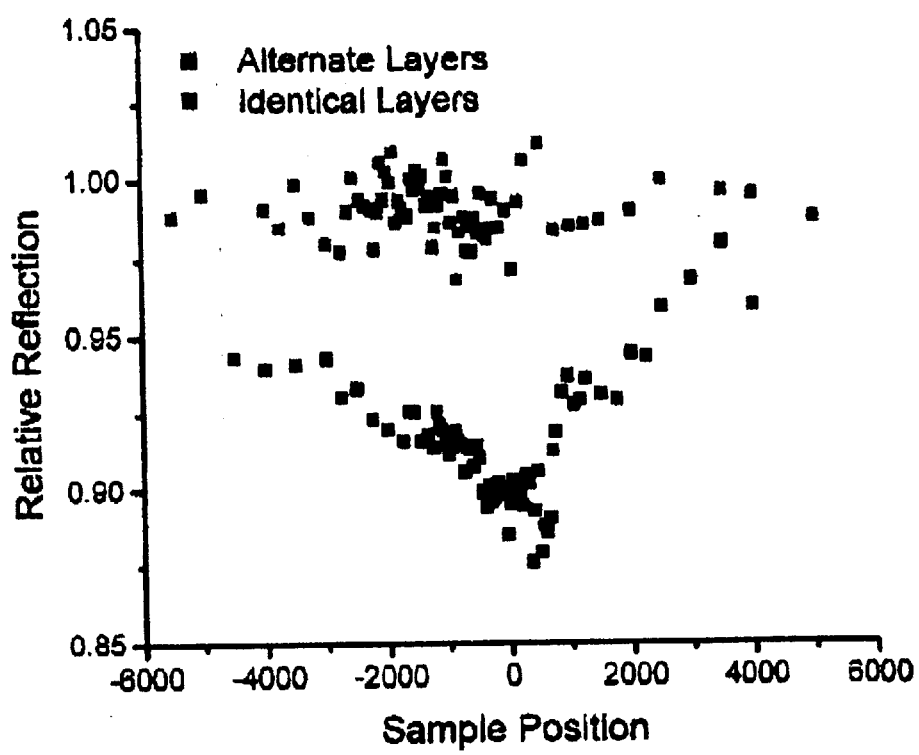
FIG. 12 shows reflectivity at 573 nm as a function of distance from focus for a 14 mil, 4096 layer, polycarbonate/ polycarbonate+nigrosine dye film (lower curve) compared to that for a film where the layers are identical (upper curve).

Two control experiments were performed. The upper plot in FIG. 12 shows the reflectivity as a function of position for the film where all the layers of the film contained the nonlinear dye. In this uniformly dyed film, the reflection was not position or fluence dependent. In this film, the index remained uniform throughout the film at all fluences. This confirms that reflectivity in the first film arises because of the alternate nonlinear layers.

In addition we studied the nonlinear reflection from a film consisting of alternate layers of an undyed polycarbonate and the same polymeric material with 0.2% (wt/wt) nigrosine that had 4096 layers and average thickness of the layers of 124 nm. In the latter film, a band gap near 800 nm is expected. No intensity dependent reflectivity was observed at 573 nm. The nonlinear reflectivity was observed only in the band gap of the photonic crystal. This shows a reversible nonlinear reflectivity within the band gap in this layered film. The nanolayered film behaves as a nonlinear photonic crystal.

Optical switching and the Response Time of the Reflectivity Changes.

Optical switching was demonstrated by measuring the reflectivity of a multilayer sample, in accordance with the present invention, after a short pulse pump (control) beam was incident on the sample. The multilayer sample consisted of alternate layers of an undoped polycarbonate and the same polymer with 0.2% (wt/wt) nigrosine. The film had 4096 layers and an average layer thickness of 87 nm. The response time of the reflectivity was measured by studying the reflectivity as a function of time.

Figure 14:
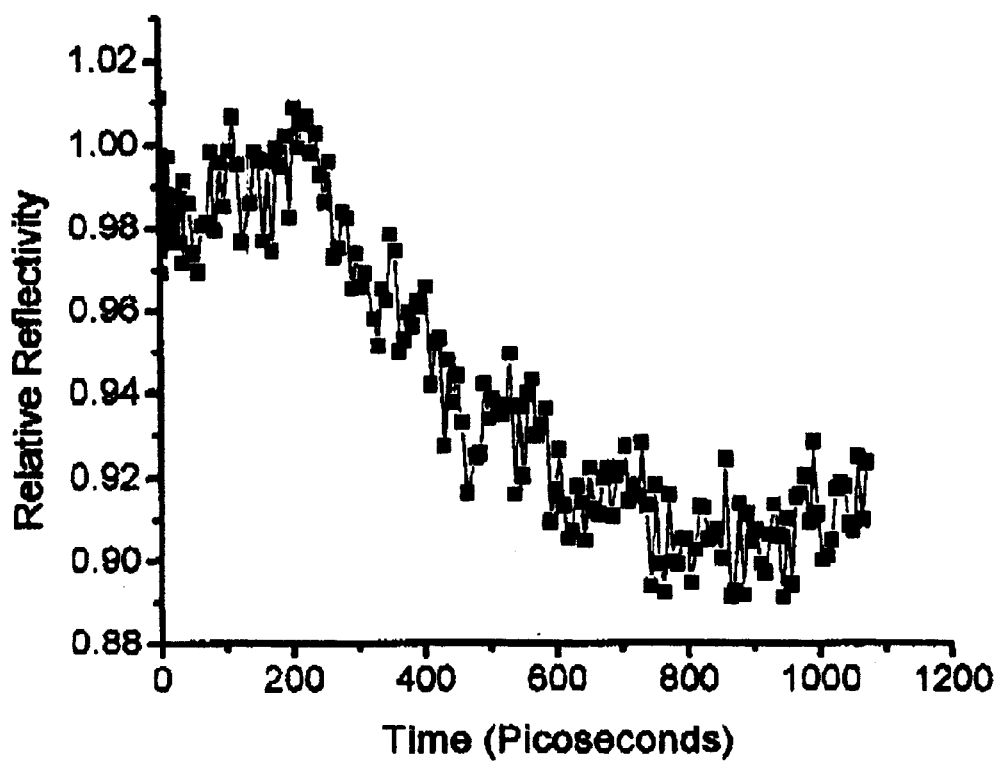
FIG. 14 shows the reflectivity as a function of time for a 4096 layer sample, in accordance with the present invention, where the alternate layers consisted of undoped polycarbonate and the same polymer containing 0.2% (wt/wt) nigrosine. The sample was mounted between glass plates. The film had an average layer thickness of 87 nanometers (nm).

The reflectivity of a multilayer sample to a probe (signal) beam at 590 nm is shown in FIG. 14 as a function of time after a 1.2 picosecond pump laser is incident on the layered sample. The reflectivity decreases with a response time of 300 to 400 picoseconds. The decrease in reflectivity occurred because the dyed layers initially had a larger index than the undyed layers and the change in index of refraction with fluence is negative. As the layers came closer to being index matched, the reflectivity decreased.

The delay in the change in reflectivity can be easily understood. In this particular nanolayered material, the dominant source of the refractive index change is due to the thermal expansion of the absorbing layer. The dynamics of the generation of the reflectivity is then analogous to the formation of a thermal grating in a dynamic grating experiment as discussed in Eichler et al (H. J. Eichler, P. Gunther, D. W. Pohl; *Laser-induced Dynamic Gratings*; Springer-Verlag, Berlin, N.Y. (1986)) which is incorporated herein by reference. Absorption of the pump light causes a temperature rise in the polymer layers containing the dye. This occurs within the 1.2 picosecond pulse width of the pump laser. The temperature rise causes the generation of acoustic waves within the sample. The acoustic waves are damped via acoustic absorption to leave a static modulation in the density across the sample. This is the "thermal grating" in dynamic grating experiments. In the layered samples, with a distribution of layer thickness, there is a distribution of periods for the acoustic waves. The observed reflectivity rises as the acoustic waves damp out to leave a static variation in the refractive index across the sample.

Figure 15:
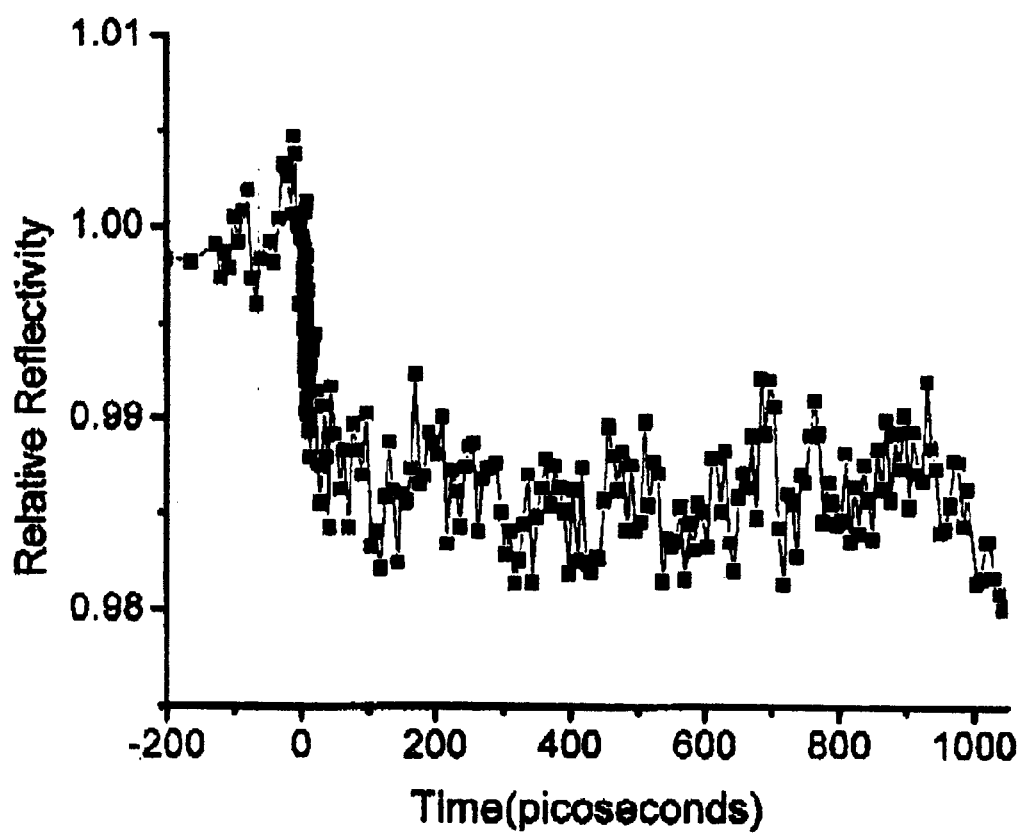
FIG. 15 shows the reflectivity as a function of time for a free standing 4096 layer sample, in accordance with the present invention, similar to that in FIG. 14. The pump beam was a 1.2 picosecond (ps) pulse at time equal 0 on the graph. The pump energy was about three times that in FIG. 14.

This demonstrates that a multilayer nonlinear photonic crystal can work as an optical switch. The response time illustrated is on the order of a few hundred picoseconds. Faster response times can be achieved by other nonlinear mechanisms or by using a higher intensity pump beam to initiate the optical switching. This is illustrated in FIG. 15 where a response time of about 10 picoseconds is achieved by a higher energy pump beam. A response time of 2 to 10 picoseconds is expected for other nonlinear mechanisms, e.g. an excited state nonlinearity.

Obviously, numerous modifications and variations of the present invention are possible in light of the above teachings. It is therefore to be understood that within the scope of the appended claims, the invention may be practiced otherwise than as specifically described herein

What is claimed is:

1. A multilayer structure comprising,
   a plurality of at least two alternating layers A and B represented by formula $(AB)_x$, where $x=2^n$, and n is in the range of from 4 to 15;
   wherein layer A is comprised of component (a) and layer B is comprised of component (b);
   wherein at least one of components (a) and (b) is an organic polymeric material containing a nonlinear dye and exhibiting nonlinear optical response; and
   wherein said organic polymeric material is selected from the group consisting of polyethylene naphthalate, isomers of polyethylene naphthalate, polyalkylene terephthalates, polyetherimides, a styrenic polymer, a polycarbonate, a poly(meth)acrylate, a cellulose derivative, a polyalkylene polymer, a fluorinated polymer, a chlorinated polymer, a polyethersulfone, polyacrylonitrile, a polyamide, polyvinylacetate, a polyetheramide, a styrene-acrylonitrile copolymer containing between 10 and 50 wt % acrylonitrile, a styrene-ethylene copolymer, poly(ethylene-1,4-cyclohexylenedimethylene terephthalate) and blends thereof.

2. The structure of claim 1, comprising a plurality of at least three alternating layers A, B and C, represented by formula $(ABC)_x$, wherein layer A is comprised of component (a), layer B is comprised of component (b) and layer C is comprised of component (c); and wherein said components (a), (b) and (c) may be the same or different, provided that at least one of the components (a), (b) and (c) exhibits nonlinear optical response.

3. The multilayer structure of claim 1, wherein the difference in the refractive index of component (a) and component (b) is in the range of 0 to 10%.

4. The multilayer structure of claim 1, wherein components (a) and (b) have a transmission window within the range of about 200 micrometers and about 350 nanometers.

5. The multilayer structure of claim 1, wherein at least one of the components (a) and (b) is a polymeric composite material.

6. The multilayer structure of claim 1, wherein said nonlinear dye affects change in the refractive index by thermal change.

7. The multilayer structure of claim 1, wherein said nonlinear dye affects change in the refractive index by optical pumping.

8. The multilayer structure of claim 1, wherein said nonlinear dye is selected from the group consisting of a phthalocyanine, a naphthalocyanine, a porphyrin, an organometallic cluster compound, a fullerene, lead tetrakis(cumylphenoxy)phthalocyanine, lead tetrakis(polydimethylsiloxane) phthalocyanine, tetra-tert-butyl(p-trifluoromethyl phenyl) indium(III) phthalocyanine and bis(trihexylsiloxy)silicon naphthalocyanine.

9. The multilayer structure of claim 8, wherein said phthalocyanine is selected from the group consisting of lead tetrakis(cumylphenoxy)phthalocyanine, lead tetrakis(polydimethylsiloxane) phthalocyanine, and tetra-tert.-butyl (para-trifluoromethyl phenyl) indium(III) phthalocyanine.

10. The multilayer structure of claim 1, wherein said multilayer structure contains at least 30 layers.

11. The multilayer structure of claim 1, wherein the thickness of each layer is in the order of from 5 nanometers to 10 micrometers.

12. The multilayer structure of claim 1, which includes a tie layer (T) between layer A and layer B; said multilayer structure represented by formula $(ATBT)_xA$, where $x=2^n$ and n is the number of multiplier elements.

13. The multilayer structure of claim 1, which includes a barrier layer.

14. The multilayer structure of claim 1, which includes a surface layer on at least one major surface thereof.

15. The multilayer structure of claim 1, wherein said multilayer structure is a film or a sheet.

16. The multilayer structure of claim 1, wherein said multilayer structure is an optical limiter.

17. The multilayer structure of claim 1, wherein said multilayer structure is an optical switch.

18. The multilayer structure of claim 17, wherein the response time of said optical switch is at least 20 femtosecond.

19. A method for forming the multilayer structure of claim 1, comprising
   extruding component (a) in an extruder (A) to form a melt stream (A) and component (b) in an extruder (B) to form a melt stream (B);
   combining melt stream (A) with melt stream (B) in a feedblock to form parallel layers (A) and (B);
   advancing said parallel layers through a series of multiplying elements (n) to form the multilayer structure.

20. The multilayer structure of claim 1, wherein said organic polymeric material is polyethylene naphtalate.

21. The multilayer structure of claim 1, wherein said organic polymeric material is polyalkylene terephthalate.

22. The multilayer structure of claim 1, wherein said organic polymeric material is a polyetherimide.

23. The multilayer structure of claim 1, wherein said organic polymeric material is a styrenic polymer.

24. The multilayer structure of claim 23, wherein said styrenic polymer is selected from the group consisting of atactic polystyrene, isotactic polystyrene, syndiotactic polystyrene, a-methyl-polystyrene and a para-methyl-polystyrene.

25. The multilayer structure of claim 1, wherein said organic polymeric material is a polycarbonate.

26. The multilayer structure of claim 25, wherein said polycarbonate is bisphenol-A-polycarbonate.

27. The multilayer structure of claim 1, wherein said organic polymeric material is a poly(methyl)methacrylate.

28. The multilayer structure of claim 1, wherein said organic polymeric material is a cellulose derivative.

29. The multilayer structure of claim 28, wherein said cellulose derivative is selected from the group consisting of ethyl cellulose, cellulose acetate, cellulose propionate, cellulose acetate butyrate and cellulose nitrate.

30. The multilayer structure of claim 1, wherein said organic polymeric material is a polyalkylene polymer.

31. The multilayer structure of claim 30, wherein said polyalkylene polymer is selected from the group consisting of polyethylene, polypropylene, polybutylene, polyisobutylene and poly(4-methyl)pentene.

32. The multilayer structure of claim 1, wherein said organic polymeric material is a fluorinated polymer.

33. The multilayer structure of claim 32, wherein said fluorinated polymer is selected from the group consisting of perfluoroalkoxy resins, polytetrafluoroethylene, fluorinated ethylene-propylene copolymers and polyvinylidene fluoride.

34. The multilayer structure of claim 1, wherein said organic polymeric material is a chlorinated polymer.

35. The multilayer structure of claim 1, wherein said organic polymeric material is a polyethersulfone.

36. The multilayer structure of claim 1, wherein said organic polymeric material is polyacrylonitrile.

37. The multilayer structure of claim 1, wherein said organic polymeric material is a polyamide.

38. The multilayer structure of claim 1, wherein said organic polymeric material is polyvinylacetate.

39. The multilayer structure of claim 1, wherein said organic polymeric material is a polyetheramide.

40. The multilayer structure of claim 1, wherein said organic polymeric material is a styrene-acrylonitrile copolymer containing between 10 and 50 wt % acrylonitrile.

41. The multilayer structure of claim 1, wherein said organic polymeric material is a styrene-ethylene copolymer.

42. The multilayer structure of claim 1, wherein said organic polymeric material is poly(ethylene-1, 4-cyclohexylenedimethylene terephthalate.

43. The multilayer structure of claim 1, wherein said dye is a phthalocyanine.

44. The multilayer structure of claim 1, wherein said dye is naphthalocynine.

45. The multilayer structure of claim 1, wherein said dye is a porphyrin.

46. The multilayer structure of claim 1, wherein said dye is an organometallic cluster compound.

47. The multilayer structure of claim 1, wherein said dye is a fullerene.

48. The multilayer structure of claim 1, wherein said dye is lead tetrakis(cumylphenoxy)phthalocyanine.

49. The multilayer structure of claim 1, wherein said dye is tetra-tert-butyl(p-trifluoromethyl phenyl) indium(III).

50. The multilayer structure of claim 1, wherein said dye is bis(trihexylsiloxy)silicon naphthalocyanine.

51. A multilayer structure comprising, a plurality of at least two alternating layers A and B represented by formula $(AB)_x$, where $x=2^n$, and n is in the range of from 4 to 15;

wherein layer A is comprised of component (a) and layer B is comprised of component (b);

wherein at least one of components (a) and (b) exhibits nonlinear optical response; and wherein said component (a) is an oligomeric material (A) and said component (b) is an oligomeric material (A) containing a nonlinear dye.

52. A multilayer structure comprising, a plurality of at least two alternating layers A and B represented by formula $(AB)_x$, where $x=2^n$, and n is in the range of from 4 to 15;

wherein layer A is comprised of component (a) and layer B is comprised of component (b);

wherein at least one of components (a) and (b) exhibits nonlinear optical response; and wherein the difference in the refractive index of component (a) and component (b) is 0.

53. A multilayer structure comprising, a plurality of at least two alternating layers A and B represented by formula $(AB)_x$, where $x=2^n$, and n is in the range of from 4 to 15;

wherein layer A is comprised of component (a) and layer B is comprised of component (b);

wherein at least one of components (a) and (b) is an organic polymeric material containing a nonlinear dye and exhibiting nonlinear optical response; and wherein said component (a) is a styrene-acrylonitrile copolymer containing 20 wt % of acrylonitrile and component (b) is a styrene-acrylonitrile copolymer containing 25 wt % of acrylonitrile.

* * * * *

UNITED STATES PATENT AND TRADEMARK OFFICE
CERTIFICATE OF CORRECTION

PATENT NO. : 6,696,142 B2  
DATED : February 24, 2004  
INVENTOR(S) : Bear et al.

It is certified that error appears in the above-identified patent and that said Letters Patent is hereby corrected as shown below:

Column 3,  
Line 26, "considered as ID nonlinear" should read -- considered as 1D nonlinear --.

Column 12,  
Lines 5-6, "nonlinear ID photonic" should read -- nonlinear 1D photonic --.  
Line 8, "of the ID photonic" should read -- of the 1D photonic --.  
Line 44, "was f/S focusing" should read -- was f/5 focusing --.

Column 13,  
Line 16, "nixing apparatus" should read -- mixing apparatus --.  
Line 33, "ID photonic" should read -- 1D photonic --.

Column 19,  
Lines 15-16, "poly(ethylene-1,4-cyclohexylenedimethylene terephthalate." should be -- poly(ethylene-1,4-cyclohexylenedimethylene terephthalate. --.

Signed and Sealed this

Sixth Day of July, 2004

JON W. DUDAS  
*Acting Director of the United States Patent and Trademark Office*

UNITED STATES PATENT AND TRADEMARK OFFICE
CERTIFICATE OF CORRECTION

PATENT NO. : 6,696,142 B2
DATED : February 24, 2004
INVENTOR(S) : Baer et al.

It is certified that error appears in the above-identified patent and that said Letters Patent is hereby corrected as shown below:

Column 3,
Line 26, "considered as ID nonlinear" should read -- considered as 1D nonlinear --.

Column 12,
Lines 5-6, "nonlinear ID photonic" should read -- nonlinear 1D photonic --.
Line 8, "of the ID photonic" should read -- of the 1D photonic --.
Line 44, "was f/S focusing" should read -- was f/5 focusing --.

Column 13,
Line 16, "nixing apparatus" should read -- mixing apparatus --.
Line 33, "ID photonic" should read -- 1D photonic --.

Column 19,
Lines 15-16, "poly(ethylene-1,4-cyclohexylenedimethylene terephthalate." should be -- poly(ethylene-1,4-cyclohexylenedimethylene terephthalate). --.

This certificate supersedes Certificate of Correction issued July 6, 2004.

Signed and Sealed this

Twenty-eighth Day of September, 2004

JON W. DUDAS
*Director of the United States Patent and Trademark Office*